United States Patent [19]

Peterman et al.

[11] Patent Number: 5,001,430

[45] Date of Patent: Mar. 19, 1991

[54] APPARATUS FOR LOCATING CONCEALED ELECTRICAL CONDUCTORS

[75] Inventors: Earl J. Peterman, Philo; David L. Peterman, Redwood Valley, both of Calif.

[73] Assignee: Heath Consultants, Inc., Houston, Tex.

[21] Appl. No.: 547,816

[22] Filed: Jul. 2, 1990

Related U.S. Application Data

[63] Continuation of Ser. No. 361,229, Jun. 5, 1989, abandoned.

[51] Int. Cl.$^5$ .......................... G01V 3/08; G01V 3/10; G01R 19/00
[52] U.S. Cl. ......................................... 324/326; 324/67
[58] Field of Search ................ 324/66, 67, 326 T, 329

[56] References Cited

U.S. PATENT DOCUMENTS

4,112,349 9/1978 Weber ...................................... 324/3

Primary Examiner—Walter E. Snow
Attorney, Agent, or Firm—Thomas E. Schatzel

[57] ABSTRACT

An apparatus and method for determining the location of a concealed conductive object. The method includes the steps of determining the lateral position of the object by using an antenna array to detect a signal propagating on the object. The antenna array is comprised of at least one center antenna positioned perpendicular to a surface concealing the object and at least two antennas symmetrically positioned about the center antenna at angles not equal to ninety degrees. The depth of the concealed object is determined by using a bottom sensor to detect the signal propagating on the object as a first signal. A vertically displaced top sensor then detects the signal as a second signal which is amplified by a variable gain amplifier until it equals the first signal. The depth of the object is calculated from the gain increase required to achieve equality between the first and second signals. The variable gain amplifier comprises a plurality of iteratively connected amplifiers whose gains are set by digital commands from an up-/down counter. The gain increase is determined by a direct current, digital-to-analog converter amplifier which receives the same digital commands as the variable gain amplifier. The lateral direction to the object is determined by comparing the phase of the signal generated by the antenna array to a reference phase.

16 Claims, 6 Drawing Sheets

Fig_1  Fig_2

Fig_3

Fig. 4

Fig_5

Fig_6

Fig_14

Fig_7

Fig_8

Fig_9

Fig_10

Fig._13

Fig_11

Fig_12

Fig_15

Fig_16

APPARATUS FOR LOCATING CONCEALED ELECTRICAL CONDUCTORS

This is a continuation of copending application(s) Ser. No. 07/361,229 filed on 6/5/89, now abandoned.

BACKGROUND OF THE INVENTION

1. Field of the Invention

This invention relates generally to an apparatus for automatically locating concealed electrical conductors and more particularly to an electrical conductor locating apparatus that utilizes a pair of horizontal sensors and a variable gain amplifier in determining the depth of the conductor and an array comprising at least two angled sensors and a vertical sensor for determining the lateral position of the conductor.

2. Description of the Prior Art

Several electronic apparatuses are presently used for automatically determining the location of concealed electrical conductors. For example, U.S. Pat. No. 4,387,340, issued to Earl J. Peterman on June 7, 1983 describes an apparatus for determining the distance to a concealed conductor that utilizes a top and bottom sensor to detect the flux from an electromagnetic signal propagating on the concealed conductor. A problem with the apparatus of the '340 patent is the need for the signals from the top and bottom sensors, $e_t$ and $e_b$, respectively, to be accurately quantified. At mid to large distances, the values for $e_t$ and $e_b$ approach one another. Slight errors in quantifying either value are exaggerated by the subtraction step utilized in calculating the distance to the conductor, thus producing significant errors in the resulting distance measurement.

U.S. Pat. No. 4,520,317, issued to Earl J. Peterman on May 28, 1985, describes an apparatus for determining the lateral direction to a concealed electrical conductor that utilizes a pair of coaxial sensors to detect the lateral displacement of the conductor from the apparatus. A problem with the coaxial configuration of the sensors is that the sensitivity of the sensors varies greatly with increasing distance of the target conductor from the locating apparatus.

SUMMARY OF THE PRESENT INVENTION

It is therefore an object of the present invention to provide an improved conductor locating apparatus capable of accurately determining the distance from the concealed conductor to the locating apparatus.

It is another object of the present invention to provide a conductor locating apparatus that does not require the signals from the top and bottom sensors to be accurately quantified.

It is another object of the present invention to provide a conductor locating apparatus whose left/right sensitivity remains approximately constant with increasing distance of the conductor from the locating apparatus.

It is another object of the present invention to provide a conductor locating apparatus in which the left/right sensitivity of the apparatus can be tailored to satisfy working requirements.

Briefly, a preferred embodiment of the present invention includes a circuit housing unit and an elongated vertical support member. A bottom sensor (e.g. horizontal coil antenna) is positioned near an end of the vertical support member. A top sensor (e.g. a horizontal coil antenna) is positioned inside the circuit housing unit which is attached to the opposite end of the vertical support member from the bottom sensor. An angled left sensor and an angled right sensor are located inside of left and right sensor housing units, respectively, which are attached to opposite sides of the circuit housing unit. A vertical center sensor is positioned inside the vertical support member between the bottom sensor and the top sensor.

The electronic circuit for processing the signals received by the various sensors is also located inside the circuit housing unit. An electrical signal propagating along a concealed conductor is detected by the sensors and converted to a signal voltage. The signal voltage from the bottom sensor ($e_b$) is amplified up to a standard value by a variable gain amplifier ($e_b$ becomes $E_b$) and is processed by a phase detector and DC amplifier ($E_b$ become $E_B$) and $E_B$ is directed to a comparator. The signal voltage from the top sensor ($e_t$) is then directed to the variable gain amplifier ($e_t$ becomes $E_t$) and is processed by the phase detector and DC amplifier ($E_t$ becomes $E_T$). In the variable gain amplifier, digital commands from a digital controller increase the gain in a plurality of amplifier stages until $E_T$ equals $E_B$. The amount of gain increase required to achieve this equality is used in calculating the distance from the conductor to the locating apparatus thereby eliminating the need to accurately quantify $E_T$ and $E_B$.

The left, right and center sensors are used in determining the lateral displacement of the concealed conductor from the locating apparatus. Ideally, a centerline extending down the length of the vertical support member bisects the concealed conductor. The center sensor is positioned parallel to the centerline and the left and right sensors are symmetrically positioned about the centerline, with the longitudinal axes of the left and right sensors lying in the same plane. The left and right sensors are positioned at an angle such that a line coincident with the longitudinal axes of either the left or right sensors forms an angle $\phi$ with the horizontal axis of the bottom sensor.

A voltage $e_s$, generated by the array of the left, right and center sensors is related to the geometrical arrangement and relative sensor sensitivity of the array. The phase and amplitude of $e_s$ can be compared to $E_B$ to provide the lateral direction and relative distance to the concealed conductor. The design of the sensor array renders $e_s$ relatively insensitive to the distance between the concealed conductor and the locating apparatus thereby allowing the left/right sensitivity of the apparatus to be optimized.

An advantage of the present invention is that the distance from the concealed conductor to the locating apparatus can be more accurately determined.

Another advantage of the present invention is that gain increase, rather than the magnitude of the signals from the top and bottom sensors, is automatically measured.

Another advantage of the present invention is that the geometrical arrangement of the left, right and center sensor array yields a left/right sensitivity that is not substantially affected by the distance of the conductor from the locating apparatus.

Another advantage of the present invention is that the geometrical arrangement of the left, right and center sensor array can be varied so as to tailor the left/right sensitivity of the conductor locating apparatus to satisfy different working conditions.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
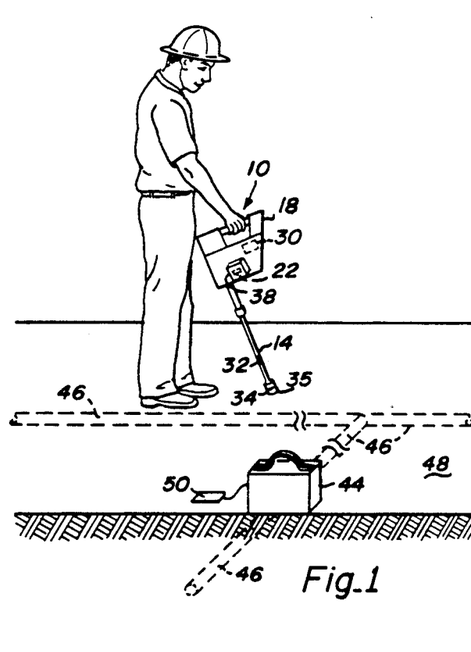
FIG. 1 is a perspective view of a concealed conductor locating apparatus according to the present invention.

FIG. 1 shows an apparatus, designated by the general reference numeral 10, for locating concealed conductors. The apparatus 10 comprises a vertical support 14 and a circuit housing unit 18. A left antenna housing unit 22 is attached to the left side of the circuit housing unit 18 and a right antenna housing unit 26 is attached to the right side of the unit 18 (shown in FIG. 2). A top sensor 30 is housed within the circuit housing unit 18 and a center sensor 32 is housed within the vertical support 14. A bottom sensor 34, which has the same sensitivity as the top sensor 30, is housed in a lower portion 35 of the vertical support 14. A left sensor 38 and a right sensor 42 (not shown) are housed within the left and right antenna housing units 22 and 26, respectively.

A transmitter 44 is coupled to an electrical conductor 46 concealed by a surface 48 such as the earth or pavement, etc. The transmitter 44, which is placed above the surface 48, is an electromagnetic signal transmitter operating at about 82 kHz. The transmitter frequency can be varied depending on the working requirements. For example, 6380 Hz is a good transmitter frequency when the signal must travel long distances on the conductor 46.

The transmitter 44 is coupled to the electrical conductor 46 by a coupling means 50. The coupling means 50 is not part of the present invention and can be any means for coupling the signal generated by the transmitter 44 onto the conductor 46. The most selective coupling means comprises a clamp or split core placed around the conductor 46 for inducing the signal onto the conductor 46. Other possible coupling means 50 include an ohmic connector (e.g. a wire connection) and an inductive connector such as a ferrite rod antenna placed on the surface 48 perpendicular to the conductor 46 for inducing a current in the conductor 46. The electrical conductor is an object capable of conducting the electromagnetic signal generated by the transmitter 44 (e.g. a telephone cable, a pipe or similar line type conductor).

In FIG. 1, the apparatus 10 is shown in a tilted position which is used while the lateral position of the conductor 46 is being determined. During depth measurements, the apparatus 10 is held with the vertical support 14 perpendicular to the surface 48 with the lower portion 35 resting on the surface 48.

Figure 2:
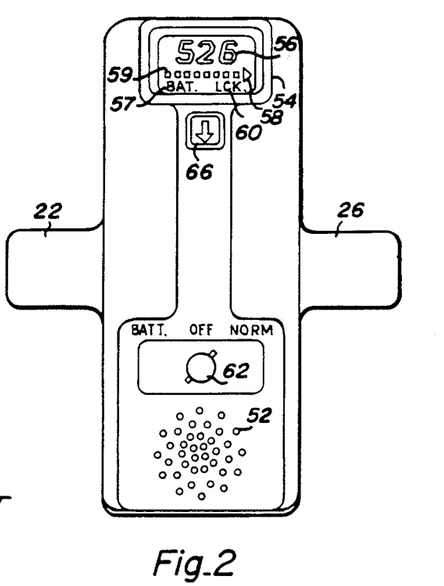
FIG. 2 is a top view of the concealed conductor locating apparatus.

FIG. 2 shows a top view of the apparatus 10. A top external surface of the circuit housing unit 18 includes an audio speaker 52 and a display panel 54. The display panel 54, which in the preferred embodiment is an LCD type readout requiring a backplane drive, includes a digital readout 56, a battery legend 57, a direction indicator 58, a distance indicator 59 and a lock indicator 60. Of course, all of these functions would not be displayed simultaneously as shown in FIG. 2. A mode selector switch 62 and a depth switch 66 are also included on the outside of the circuit housing. The mode switch 62 has three settings: battery check, normal and off.

Figure 3:
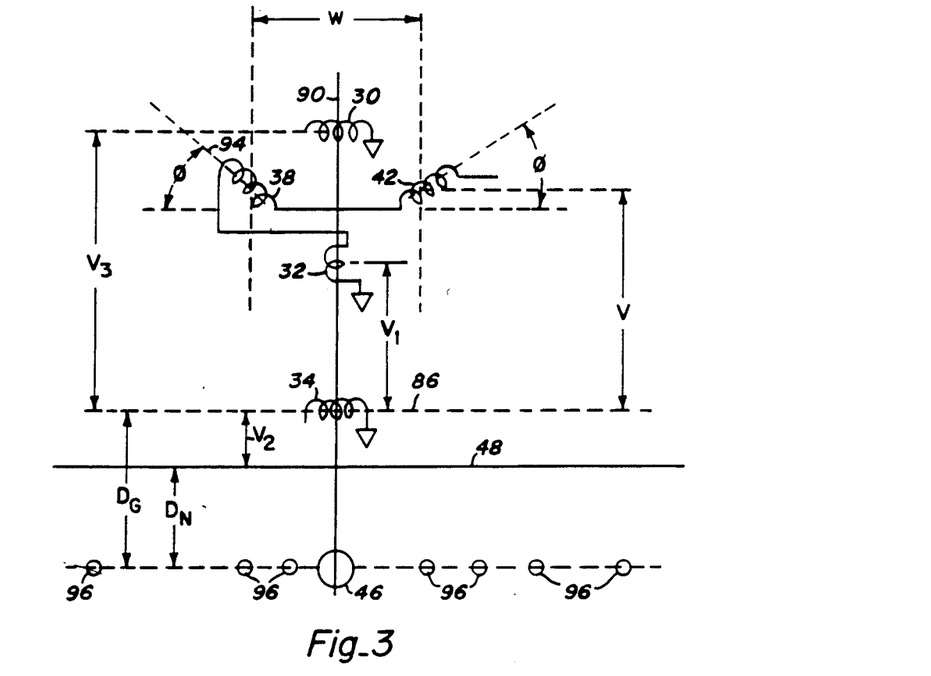
FIG. 3 is a schematic diagram showing the geometrical arrangement of the sensors according to the present invention.

FIG. 3 shows the orientation of the sensors 30, 32, 34, 38 and 42 relative to the surface 48. In the preferred embodiment, each of the sensors 30, 32, 34 (turned as one), 38 and 42 comprise a tuned coil antenna. In other embodiments, the sensors 30, 32, 34, 38 or 42 could be, for example, magnetic flux-gate sensors or Hall Effect sensors.

The coils of the bottom sensor 34 are oriented so that a line 86 coincident with the longitudinal (magnetic) axis of the sensor 34 is parallel to the surface 48 and approximately normal to the path of the conductor 46. The bottom sensor 34 is positioned a distance $V_2$ above the surface 48. Typically, $V_2$ is about one inch. The top sensor 30 is positioned above the sensor 34 with its longitudinal axis parallel to the line 86. A centerline 90 is perpendicular to the surface 48 and bisects the sensor 34. The sensor 30 is positioned at an angle from the centerline 90 (i.e. sensor 30 is about five inches above the plane containing the lines 86 and 90).

Many types of inductive coil antennas are suitable for use in the preferred embodiment. Depending on the frequency of the transmitter 44, antennas with or without ferrite cores and having between one turn and several thousand turns can be used. For example, at 82 kHz, an inductive antenna without a ferrite core antenna is preferred, while at 6380 Hz, an inductive antenna with a ferrite core could be utilized.

The center sensor 32 is positioned between the top sensor 30 and the bottom sensor 34. The longitudinal axis of the sensor 32 is parallel to the centerline 90 making the sensor 32 a vertical antenna. The left sensor 38 is positioned to the left of the centerline 90 (left of an observer facing the apparatus 10) and is angled such that a line 94 coincident with the longitudinal (magnetic) axis of the sensor 38 makes an angle $\phi$ with the line 86. The right sensor 42 is a mirror image of the left sensor 38 and is symmetrically disposed to the right of the centerline 90 at the angle $\phi$ which is not equal to 0° or 90°. In the preferred embodiment, the angle $\phi$ is positive and the sensors 38 and 42 are coplanar in a plane positioned approximately three inches above the plane containing the lines 86 and 90.

A plurality of positions 96 are indicated in FIG. 3 and represent positions that the conductor 46 would occupy if it were laterally displaced from the centerline 90. In the preferred embodiment, the distance V, which is the vertical distance component between the centers of the sensors 38 or 42 and the line 86, is approximately twenty-two inches. The distance $V_1$ between the center of sensor 32 and the line 86 is approximately four inches and the distance $V_3$, which is the vertical distance component between the top sensor 30 and the line 86, is approximately twenty-two inches. The distance w separating the left antenna 38 from the right antenna 42 is approximately six inches and the angle $\phi$ is approximately one degree.

Figure 4:
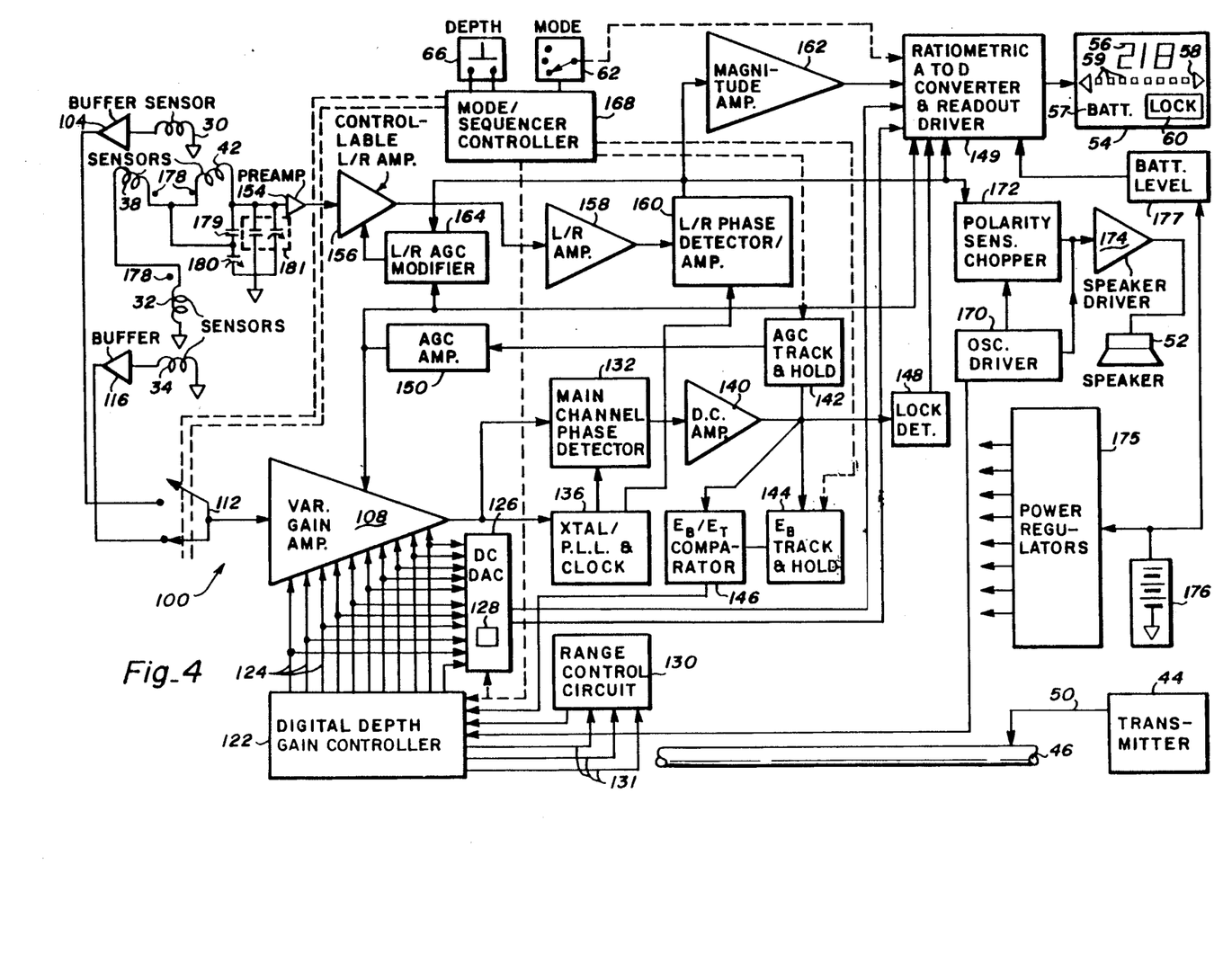
FIG. 4 is an electrical block diagram of the signal processing circuitry of the concealed conductor locating apparatus.

FIG. 4 shows an electrical circuit, designated by the general reference numeral 100, used to process signals received by the sensors 30, 34, 38, 42 and 46. The output of the top sensor 30 is connected to a buffer 104 whose output is connected to a variable gain amplifier 108 via a switch 112. Similarly, the output of the bottom sensor 34 is connected to a buffer 116 whose output is connected to the variable gain amplifier 108 via the switch 112. The gain of the variable gain amplifier 108 is controlled by a digital depth gain controller 122 via a plurality of digital command leads 124. The digital controller 122 includes an eight bit up-down counter which, in the preferred embodiment, is comprised of two four-bit counters connected together. The output of the digital controller 122 is also connected to a DC digital-to-analog converter (DAC)/computer unit 126 by a plurality of digital command leads 124. The DC-DAC unit 126 includes a depth computer 128. The outputs of a range controller circuit 130 are connected to the DC-DAC unit 126 and to the digital controller 122 and a trio of digital command leads 131 connect the digital controller 122 to the range controller circuit 130.

The output voltage of the variable gain amplifier 108 is connected to a main channel phase detector 132 and to a crystal phase-locked loop (PLL) and clock 136. The output of the PLL 136 is connected to the main channel phase detector 132. The combination of the PLL 136 and the phase detector 132 converts the voltage amplified by amplifier 108 into a DC voltage which is a function of the AC signal voltage from the amplifier 108. The DC output of the main channel phase detector 132 is amplified by a DC amplifier 140 whose output feeds an automatic gain control (AGC) track and hold circuit 142, an $E_B$ track and hold circuit 144, an $E_B/E_T$ comparator 146, and a lock detector 148. The output of the lock detector 148 feeds a ratiometric and analog-to-digital converter/readout driver circuit 149 whose output is connected to the digital display 54. An AGC amplifier 150 regulates the net gain of the variable gain amplifier 108 prior to taking a depth reading and the output from the AGC track and hold circuit 142 is connected to the AGC amplifier 150.

The $E_B/E_T$ comparator is a standard one chip circuit for determining when two voltages are equal, or if unequal, the relative direction.

The lock detector 148 activates the lock indicator 60 on the digital display 54 which tells the operator that an adequate signal is being received to permit a depth reading to be taken. The lock detector 148 comprises a transistor with a 1.5 V fixed bias applied to the base and the input from the DC amplifier 140 applied to the emitter. A lead from the collector of the transistor is connected to the readout driver circuit in the ratiometric circuit 149 and must be maintained at a certain voltage to activate the lock indicator 60. When the input from DC amplifier 140 drops below the fixed bias voltage (plus the base-emitter drop) the collector voltage of the transistor is pulled down sufficiently to prevent the lock indicator 60 from being activated.

The center sensor 32, the left sensor 38 and the right sensor 42 are connected in series. The output lead of the right sensor 42 is connected to a preamplifier 154 whose output is connected to a controllable left/right variable amplifier 156. The output of the variable amplifier 156 is connected to a left/right amplifier 158 whose output is connected to a left/right phase detector/amplifier unit 160. The output from the phase detector 160 is connected to a magnitude amplifier 162 which is a circuit comprising a unity gain inverting amplifier, resistors and a diode, connected such that a negative signal input is inverted (made positive) and a positive signal input simply by-passes the amplifier and appears unchanged at the output.

The output from the phase detector/amplifier 160 is also connected to a left/right AGC modifier 164 which receives the output from the AGC amplifier 150 and which is connected to the controllable amplifier 156. The output of the PLL 136 is connected to the phase detector/amplifier unit 160. In the preferred embodiment, the preamplifier 154 and the left/right amplifier 158 each comprise three transistors instead of commercially available amplifier chips, so as to draw less current. The preamplifier 154 is designed to have a gain of about twenty and the left/right amplifier 158 is designed to have a gain of about thirty.

The output of a mode/sequencer controller 168 is connected to the switch 112, to the digital depth gain controller 122, to the AGC track and hold circuit 142, to the signal track and hold circuit 144 and to the ratiometric readout driver 149. The depth switch 66 and the mode switch 62 are connected to the mode/sequencer controller 168 and the mode switch 62 is also connected to the ratiometric readout driver 149.

The output from an oscillator/divider circuit 170 (actually a low frequency output and a high frequency output) is connected to a polarity sensitive chopper 172 and to the digital depth gain controller 122. The outputs of the polarity chopper 172 and the oscillator divider circuit 170 are connected to a speaker driver 174 which comprises two transistors in a feedback circuit for driving the speaker 50. A power regulator 175 is connected to the electrical circuit 100 to provide power to the apparatus 10 from a power source 176. In the preferred embodiment, the power source 176 comprises three nine volt batteries connected in parallel to provide positive voltage and one nine volt battery to provide negative voltage. The power regulators 175 take the output from the power source 176 down to plus and minus six volts. A battery level translator 177 is connected between the power source 176 and the ratiometric circuit 149. When the mode switch 62 is placed in the battery position, the battery level translator causes a reading of one hundred to appear on the digital display 54 if the power source 176 is yielding nine volts and a reading of zero to appear when the power source 176 is yielding less than 6.2 volts.

The polarity sensitive chopper 172 is a circuit which either passes or chops the output signal from the left/right phase detector/amplifier 160 so as to produce an audible signal from the speaker 52 which indicates whether the apparatus 10 is to the right or the left of the electrical conductor 46. The chopper 172 works, for example, by passing a positive input signal (i.e. a signal indicating that the apparatus 10 is on the left side of the electrical conductor 46) and by inverting and chopping a negative input signal (i.e. a signal indicating that the apparatus 10 is on the right side of the electrical conductor 46). The chopping is accomplished by superimposing a 3–5 Hz square wave voltage on the negative input signal.

A plurality of phase dots 178 near the sensors 38, 42 and 32 identify the terminating connection at each winding that will have the same output voltage phase as indicated for the sensor 34 when the antennas have the orientation shown in FIG. 3 and when the conductor 46 is located six inches to the right of the centerline 90 (FIG. 3), six inches below sensor 34 and with sufficient driving current to assure accurate phase comparison.

A preferred method for accurately aligning the sensors 38, 42 and 32 is to connect a fixed capacitor 179 and a variable capacitor 180 to the array and to adjust the variable capacitor 180 when observing an on-center energized conductor at four to six feet distance. A capacitor circuit 181 comprising another fixed and variable capacitor can be utilized to bring the total capacitance to the correct value for resonance.

Figures 5, 6:
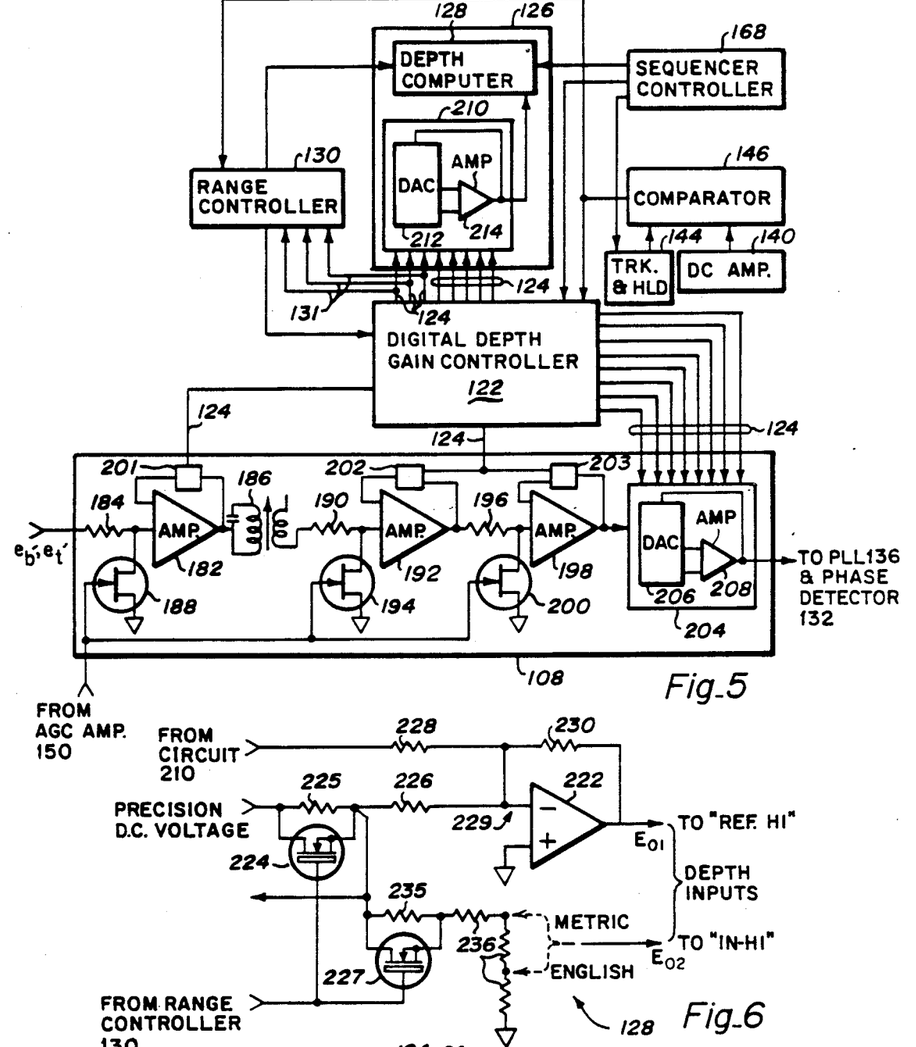
FIG. 5 is an electrical block diagram of the variable gain amplifier shown in FIG. 4.
FIG. 6 is a circuit diagram of the depth computer shown in FIG. 4.

FIG. 5 shows the variable gain amplifier 108 in more detail. The signals from the bottom sensor 34 and the top sensor 30 enter the variable gain amplifier 108 as the voltages $e_b'$ and $e_t'$, respectively. A discrete amplifier 182 is connected in series between a resistor 184 and a tuned interstage transformer 186. A field effect transistor 188 is connected in parallel between the resistor 184 and the amplifier 182. A resistor 190 is connected in series between the transformer 186 and a discrete amplifier 192. A field effect transistor 194 is connected in parallel between the resistor 190 and the amplifier 192. A resistor 196 is connected in series between the amplifier 192 and a discrete amplifier 198. A field effect transistor 200 is connected in parallel between the resistors 196 and the amplifier 198. Two of the digital command leads 124 connect the digital depth gain controller 122 to a plurality of amplifier gain control circuits 201, 202 and 203 connected across the amplifiers 182, 192 and 198, respectively. The output of the amplifier 198 is connected to an AC-DAC AMP circuit 204 which comprises an eight bit, digital-to-analog converter 206 and an amplifier 208. The output of the amplifier 208 is connected to the phase-locked loop 136 and the phase detector 132.

The digital command leads 124 also connect the digital depth gain controller 122 to the AC-DAC AMP circuit 204 and to a DC-DAC AMP circuit 210 within the DAC/computer unit 126. The circuit 210 comprises a DAC 212 and an amplifier 214 which are electronically matched with the DAC 206 and amplifier 208, respectively. The DAC's 206 and 212 are eight bit DACs, but DACs of different bit count could also be used. The outputs of the range controller circuit 130 are connected to the depth computer 128 and to the depth controller 122.

The DACs 206 and 212 act as precision step attenuators, with each step selected by an internal switch (eight switches in an 8-bit DAC) activated by binary bits conveyed to the DAC by the digital command leads 124. The internal switches and precision resistors are designed so that each successive bit creates twice the output current of the previous bit. Because the DAC is used in this invention as a negative feedback path, the gain changes inversely as the bit count progresses according to equation 1:

$$E_{out} = E_{in}(2^{N \text{ Bits}}/\text{total bit count}), \quad (1)$$

where N is eight in the preferred embodiment. Thus, the size of the gain changing steps decreases with advancing bit count, which corresponds to increasing depth of the conductor 46.

The purpose of the AC-DAC AMP 204 is to provide high resolution gain changes to compliment the larger step gain changes accomplished by the amplifiers 182, 192 and 198. Each of the discrete amplifiers 182, 192 and 198 (the first three "stages" of the variable gain amplifier 108) comprise a non-inverting amplifier whose gain is set by a conventional resistive negative feedback divider (contained within the amplifier step gain control circuits 201, 202 and 203), in which the resistance ratio rather than the total amount of active gain, determines the final amplification of each stage. An enhancement type MOSFET is used as a switch, controllable by the "Lo" or "Hi" commands from the digital depth gain controller 122, to change one of two resistor values in each divider (see FIG. 14). This is accomplished through the use of a third, adjustable resistor, which allows precise presetting of the gain change assigned to a particular stage.

Because the amplifier step gain control circuit 201 is controlled by an individual digital command lead 124 and the other two amplifier step gain control circuits 202 and 203 are controlled together by a different digital command lead 124, the gain of the amplifier 182 functions independently of the gain of the combined amplifiers 192 and 198. Amplifier 182 provides a 14% step gain (range one) and the amplifiers 192 and 198 together provide an additional 86% step gain (range two) so that range two provides a 112% step gain.

The DC-DAC AMP 210 mimics the gain change provided by the AC-DAC AMP 204. The input to the DC-DAC amp 210 is a predetermined precision DC voltage. The DC-DAC AMP 210 receives the identical bit commands that the AC-DAC AMP 204 receives because identical digital command leads 124 go to both of the DAC AMPs 204 and 210 (see FIG. 4). Thus, the output voltage of the DC-DAC AMP 210 is a direct representation of the small step gain change ($\Delta G$) accomplished by AC-DAC AMP 204. The depth computer 128 combines this information with input voltage from the range control circuit 130 to provide a combined output representing the total $\Delta G$ which is then processed by the ratiometric circuit 149.

The FETs 188, 194 and 200, in combination with their respective resistors 184, 190 and 196, act as AGC attenuators.

The digital depth gain controller 122 takes commands from the $E_B/E_T$ comparator 146 and directs the amplifiers 182, 192 and 198 and the DAC AMPs 204 and 210 to modify their gains by certain precise amounts. Additionally, the controller 122 controls the orderly transition of the gain change system from one range to another. The controller 122 also prevents the use of zero or very small binary numbers which would call for unduly large gain steps.

FIG. 6 shows the depth computer 128 in more detail. The output of the operational amplifier 222 is connected to the "reference hi" input of the ratiometric converter 149. The drain of an MOSFET 224 is connected to a precision DC voltage source and the source of the MOSFET 224 is connected to the junction of a pair of resistors 225 and 226 and to the drain of a MOSFET 227. The gate of MOSFET 224 is connected to the range one output from the range controller 130 and to the gate of the MOSFET 227.

A resistor 228 is connected between the circuit 210 and a summing junction 229 between the resistor 226 and the negative input of the amplifier 222. A resistor 230 is connected between the junction 229 and the output of the operational amplifier 222. A resistor 235 is connected between the drain and source of the MOSFET 227 and a plurality of resistors 236 are connected in series between the source of the MOSFET 227 and ground. The resistor network comprising the plurality of resistors 235 and 236 produces the "high-input" of the ratiometric converter 149.

In the depth computer 128, the op amp 222 and the resistors 228 and 230, provide a gain of exactly $-1$ to invert the negative input from the DC-DAC 210 representing the normalized DC-DAC gain of G plus the change in gain ($\Delta G$) required to bring $E_T = E_B$ during depth readings, to a positive value. The precision DC voltage then establishes exactly the current through the resistors 232 and 234 at the summing junction 220 to subtract the fixed value of G in the sum at the output of op amp 222, so that only $\Delta G$ remains. This signal goes to "Ref-Hi" of the ratiometric converter 149, representing the denominator of depth equation 2.

Some of the same precision DC voltage is divided down by the resistors 236 to become the numerator of equation 2 and goes to the "In-Hi" terminal of the ratiometric converter 149. If the resulting depth reading is desired in centimeters rather than inches, $E_02$ would be connected to the metric tap on the resistor network, rather than the english tap.

Figures 7, 8, 9, 10:
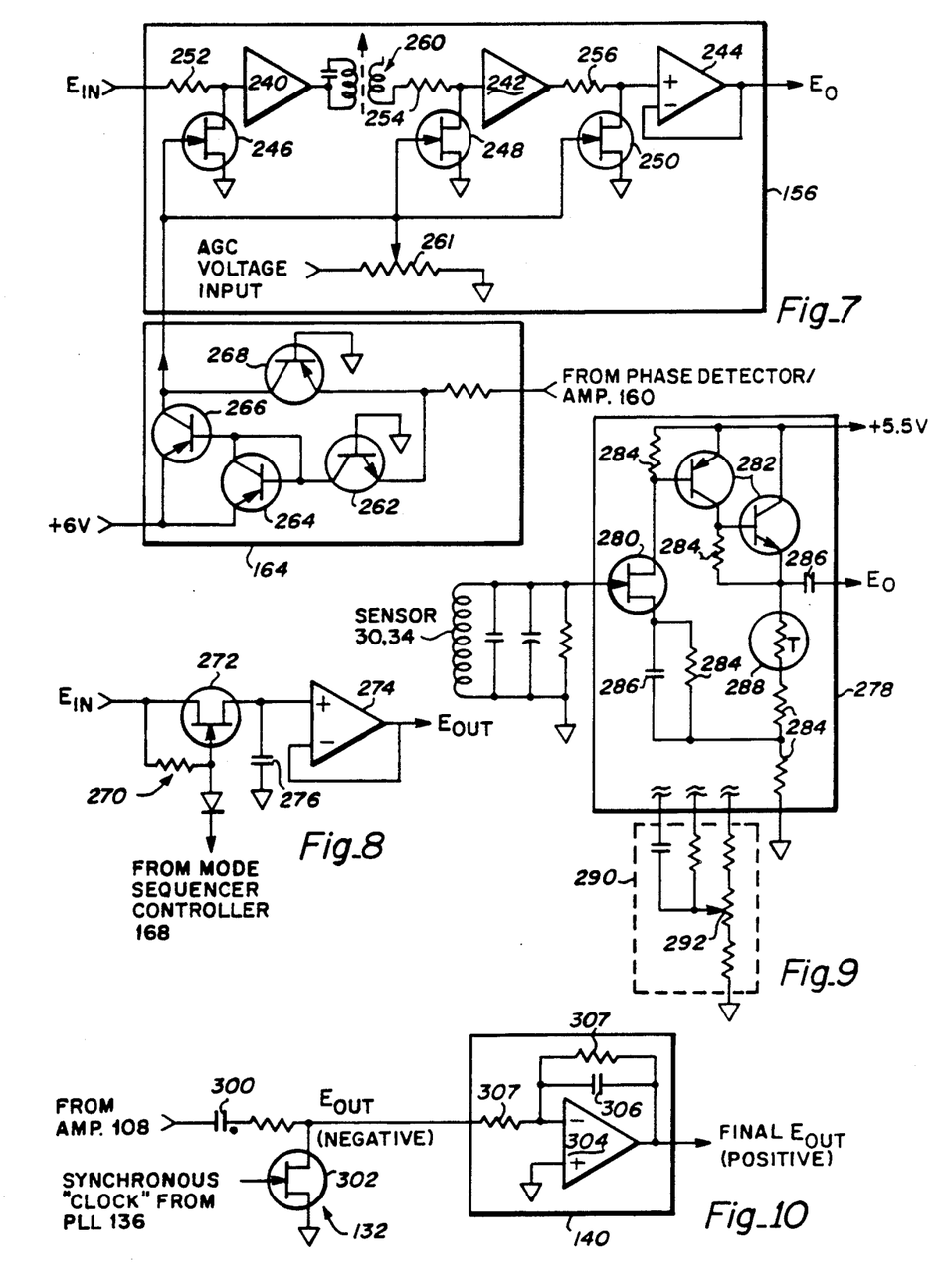
FIG. 7 is a circuit diagram of the controllable left-/right variable amplifier shown in FIG. 4.
FIG. 8 is a circuit diagram of a track and hold circuit.
FIG. 9 is an electrical circuit diagram of the buffer circuit shown in FIG. 4.
FIG. 10 is a circuit diagram of the main channel phase detector shown in FIG. 4.

FIG. 7 shows the controllable left/right variable amplifier 156 and the left/right AGC modifier 164 in more detail. An input signal ($E_{in}$) enters the amplifier 156 and is amplified by a trio of discrete amplifiers 240, 242 and 244. A plurality of FETs 246, 248 and 250 and resistors 252, 254 and 256 are connected as shown and a tuned interstage transformer 260 is connected between the amplifier 240 and the resistor 254. A potentiometer 261 provides a means for modifying the gain-tracking relationship to the variable gain amp 108.

The AGC modifier 164 comprises a plurality of transistors 262, 264 and 266 arranged so that a negative input from the left/right phase detector amp 160 will be mirrored as positive current to the amplifier 156 and positive input from the left/right phase amp 160 will pass through a transistor 268 to the amplifier 156.

FIG. 8 shows a circuit 270 used as the AGC track and hold circuit 142 and the signal track and hold circuit 144. This circuit comprises the combination of a low leakage discrete FET 272 and a unity-gain connected, low leakage buffer amplifier 274. A low dielectric absorption holding capacitor 276 (e.g. polypropylene) is connected between the FET 272 and the amp 274. While track and hold integrated circuits are commercially available, the circuit 270 is preferred because of its low power consumption and extremely low current leakage.

FIG. 9 shows a buffer circuit 278 used as the buffers 104 and 116. The purpose of the buffer circuit 278 is to provide electronic isolation between the sensors 30 and 34 and the load circuits attached to them. The sensors 30 and 34 are connected to the gate of an FET 280. A plurality of transistors 282, resistors 284 and capacitors 286 are connected to the FET 280 so as to isolate the sensors 30 or 34 from loads which would otherwise disturb the stability of the signal sensitivity of the sensors 30 or 34. A temperature sensitive element 282 (e.g. a PTC type thermistor) is used to compensate for sensitivity variations of the sensors 30 or 34 with temperature. The buffer circuit 278 would typically have very little positive gain. The gain that is present in the buffer circuit 278 can be manipulated by the temperature sensitive element 282. A gain matching circuit 290, comprising a potentiometer 292, is connected to one of the buffer circuits 278 to allow the sensor 30 to be matched to the sensor 34.

FIG. 10 shows the main channel phase detector 132 in more detail. The output from the variable gain amplifier 108 is connected to a capacitor 300 which couples only the AC part of the signal. A synchronous clock signal from the crystal PLL and clock circuit 136 enters the gate of an FET 302 and converts the AC signal to a pulsating negative DC signal. The DC amplifier 140, which is an operational amplifier 304, a smoothing capacitor 306, and a pair of resistors 307, converts the negative DC signal to a positive DC signal or greater magnitude.

The left/right phase detector/amplifier 160 comprises a circuit analogous to the main channel phase detector 132 and the DC amplifier 140 except that the 180° clock drive is connected to the FET gate and an offset adjust trimpot is used to balance out circuit produced sources of offset that would affect left/right centering accuracy.

Figures 11, 12:
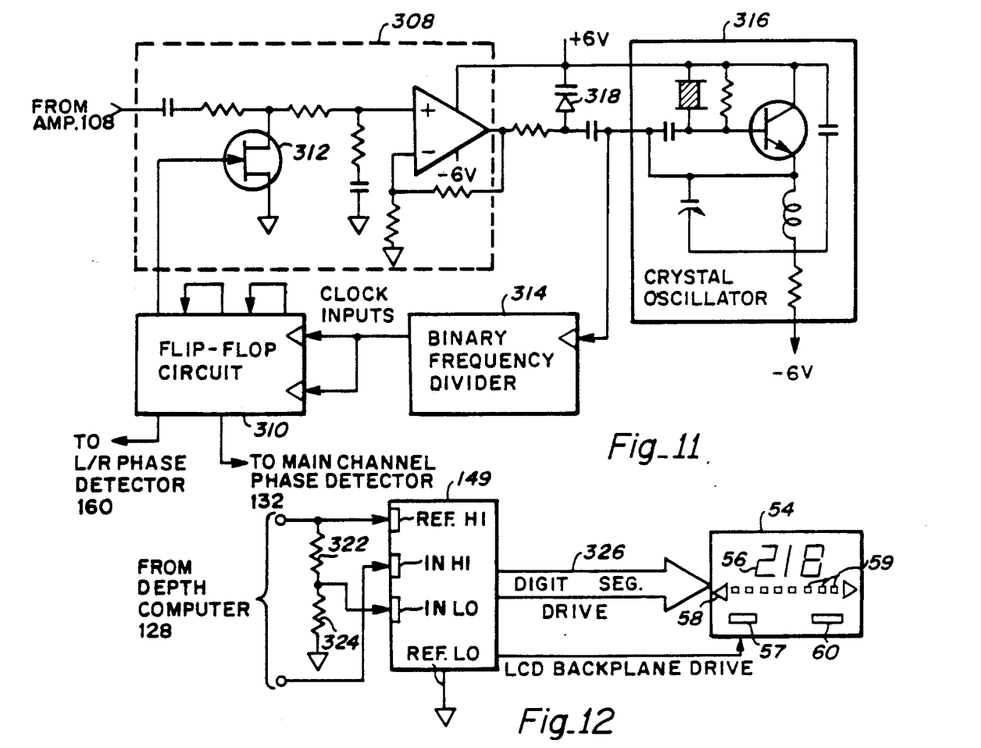
FIG. 11 is a circuit diagram of the crystal phase lock loop and clock circuit shown in FIG. 4.
FIG. 12 is an electrical block diagram of the ratiometric analog-to-digital convertor/readout driver circuit shown in FIG. 4.

FIG. 11 shows the crystal PLL and clock circuit 136 in more detail and the AC signal from the variable gain amp 108 or the controllable left/right amp 156 is connected to a phase detector circuit 308 which is similar to the circuit shown in FIG. 10. A flip-flop circuit 310 is connected to the gate of an FET 312. The flip-flop circuit 310 is a commercially available "dual-D" type (data type) flip-flop, in which the data that is present at its "D" input is transferred through its "Q" output at the next positive-going edge of its clock input. A circularly connected pair of such flip-flop circuits produce four different outputs with a frequency one-fourth the initial "clock" input phased 90° from one another corresponding (in sequence) to the succeeding positive-going edges of the mutual "clock" input. In the present invention, only the 0°, 90° and 180° clock outputs are utilized.

A binary frequency divider 314 and a standard crystal oscillator 316 operating at approximately 2.6 or 3.2 MHz provide the clock input to the flip-flop circuit 310. A varicap capacitor 318 is connected between the phase detector circuit 308 and the crystal oscillator 316 to pull the oscillator frequency into phase locked synchronism with the input from the variable gain amplifier 108.

FIG. 12 shows the ratiometric analog-to-digital converter/readout driver circuit 149 in more detail. The ratiometric circuit 149 comprises a standard ratiometric chip for providing a backplane drive and for driving the segments on the display 54 and used for applications requiring a ratiometric step (i.e. division). The ratiometric circuit 149 has a plurality of input and output terminals designated as "Ref. Hi", "In Hi", "In Lo" and "Ref. Lo". The voltages representing the denominator and numerator in the desired ratiometric step are inputted to the "Ref. Hi" and "In Hi" terminals, respectively.

A pair of resistors 322 and 324 are positioned so as to place a small percentage of the voltage representing the denominator between the "In Lo" terminal and the circuit common. This allows a subtraction step to be carried out after the ratiometric step is completed.

A digit segment unit 326 comprises a plurality of leads to convey digit segment drive from the ratiometric integrated circuit to the digital readout 56. A plurality of EX-OR gates are included in the ratiometric analog-to-digital converter/readout driver circuit 149 for activating the other legends and symbols on the display panel 54 (i.e. the battery legend 57, the direction indicator 58, the distance indicator 59 and the lock indicator 60).

Figure 13:
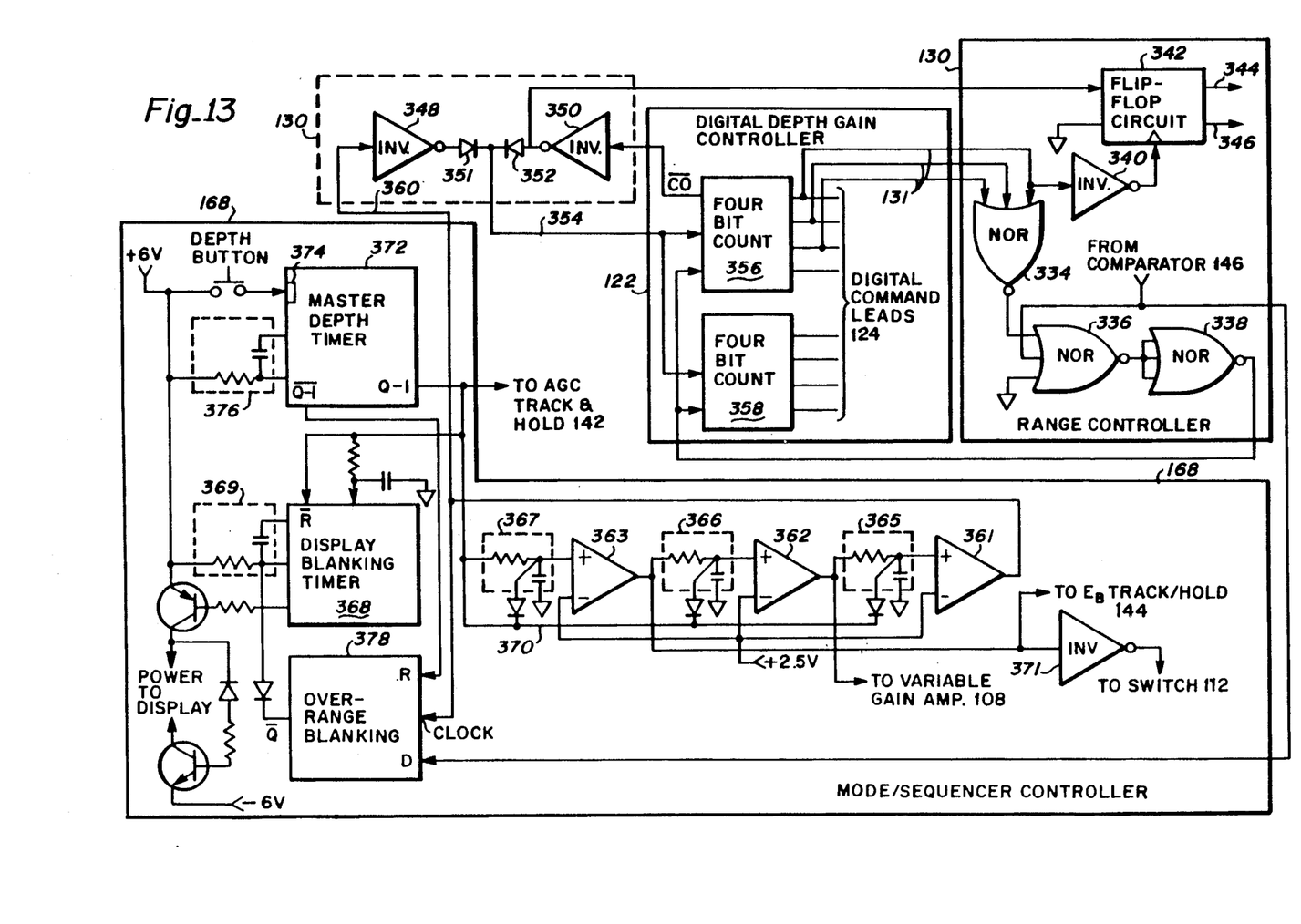
FIG. 13 is an electrical block diagram of the range control circuit and mode/sequencer controller shown in FIG. 4.

FIG. 13 shows the mode sequencer/controller unit 168, the range controller circuit 130 and the digital depth gain controller 122 in more detail. The range controller circuit 130 comprises a trio of three-input NOR (not or gate integrated circuit) gates 334, 336 and 338. An inverter 340 is connected to one input of the NOR gate 334 and to a D-type flip-flop circuit 342. A first output lead 344 of circuit 342 goes to the FETs 224 and 226 in the depth computer 128. A second output lead 346 goes to the variable gain amplifier 108.

The outputs of a pair of inverters 348 and 350, which are part of the range controller circuit 130, are connected through two "OR"-ing diodes 351 and 352 and a lead 354 to the preset inputs of the digital depth gain controller 122. The digital command leads 124 transmit binary data bits from the four bit counters 356 and 358 to the AC-DAC AMP circuit 204 and the DC-DAC AMP circuit 210. The trio of leads 131 connect the four-bit counter 356 to the NOR gate 334.

The mode/sequencer controller 168 is connected to the inverter 348 via the lead 360. A trio of comparators 361, 362 and 363 and a trio of R-C circuits 365, 366 and 367 are connected serially between the lead 360 and a display blanking timer 368 which is a standard one-shot multivibrator circuit. An R-C circuit 369 having a one second time constant is connected to the display timer 368. The purpose of the display blanking timer 368 is to turn off the digital display 54 for a brief period to indicate to the operator that the display of depth data is about to begin.

The trio of comparators 361, 362 and 363 are connected to the AGC track and hold circuit 142 by a lead 370. An inverter 371 is connected to the comparator 363. A master depth timer 372, which is a standard one-shot multivibrator circuit, is also connected to the lead 370. The depth button 66 is connected to the master timer 372 via a trigger input 374. An R-C circuit 376 having a seven second time constant is connected to the master timer 372.

An overrange blanking circuit 378, which is a D-type flip-flop circuit, is connected to the display blanking timer 368 and to the range controller 130. The purpose of the overrange blanking circuit 378 is to turn off the digital display 54 if a target conductor 46 outside the one hundred and fifty-five inch range of the apparatus 10 is encountered.

Figure 14:
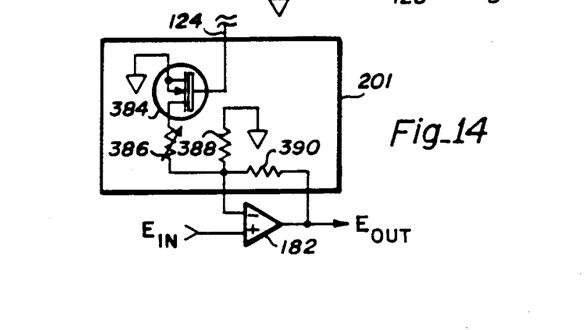
FIG. 14 is a circuit diagram of the amplifier gain control circuit shown in FIG. 5.

FIG. 14 shows the amplifier step gain control circuit 201 in more detail (the amplifier gain control circuits 202 and 203 are identical to the circuit 201). A MOSFET 384 and an adjustable resistor 386 are connected between ground and the negative input of the amplifier 182. A resistor 388 is connected between the negative input of the amplifier 182 and ground. A resistor 390 is connected between the negative input and the output terminals of the amplifier 182.

A "Hi" signal from the digital depth gain controller 122 turns on the MOSFET 384 thus placing the variable resistor 386 in parallel with the resistor 388 thereby increasing the gain of the amplifier 182. The exact gain increase can be adjusted by varying the resistance of the variable resistor 386.

Figure 15:
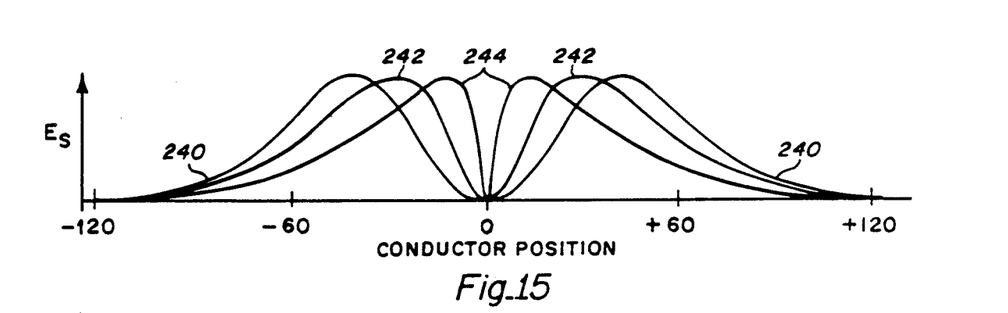
FIG. 15 is a graphical representation showing the dependence of the left/right sensitivity of a prior art apparatus on the distance from the conductor to the apparatus.

FIG. 15 shows a plot of sensor voltage ($E_S$) versus conductor position for the two sensor, coaxial sensor configuration shown in U.S. Pat. Nos. 4,387,340 and 4,520,317. The conductor position refers to the lateral displacement of the conductor 46 from the centerline 90. In other words, conductor position refers to the distance from the centerline 90 to the positions 96 in FIG. 3 of this document. Displacements to the left of the centerline 90 are assigned negative values while displacements to the right are assigned positive values. A curve 240 represents the variation in $E_S$ when the conductor 46 is a large distance from the surface 48. A curve 242 represents the variation in $E_S$ when the conductor 46 is a moderate distance from the surface 48 and a curve 244 represents the variation in $E_S$ when the conductor 46 is close to the surface 48.

Figure 16:
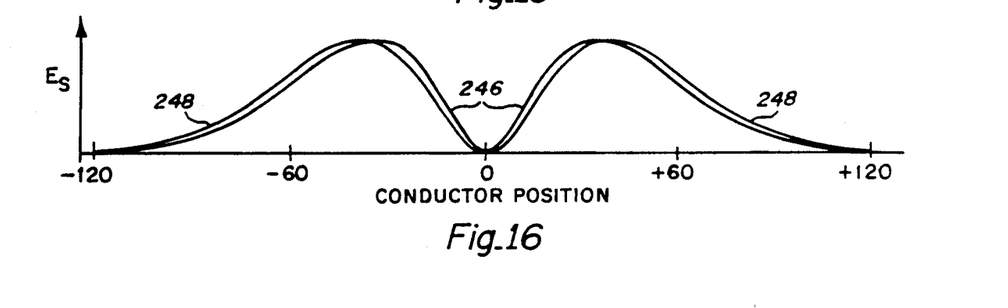
FIG. 16 is a graphical representation showing that the left/right sensitivity of the present invention is not substantially dependent on the distance from the conductor to the apparatus.

FIG. 16 shows a plot of the sensor array voltage ($E_S$) versus conductor position for the three-coil, Y-configuration sensor arrangement of the present invention. A curve 246 represents the variation in $E_S$ when the conductor 46 is a large distance from the surface 48 (i.e. $D_N$ is large) and a curve 248 represents the variation in $E_S$ when the conductor 46 is close to the surface 48 (i.e. when $D_N$ is small).

Referring now to FIGS. 1 and 4, the depth $D_N$ is determined by impressing an electromagnetic signal on the electrical conductor 46 with the transmitter 44. The apparatus 10 is positioned in a vertical position (not angled as shown in FIG. 1) in contact with the surface 48, and the depth switch 66 is activated. Referring to FIG. 4, when the depth switch 66 is activated, a timer within the mode sequencer controller 168 is activated and the bottom sensor 34 remains connected to the input of the variable gain amplifier 108 while the AGC voltage to the AGC attenuators in 108 is held constant. The flux generated by the electromagnetic signal traveling on the conductor 46 is detected by the bottom sensor 34 as the voltage $e_b$. The voltage $e_b$ is changed to a signal voltage $e_b'$ by the affect of the buffer 116. The voltage $e_b'$ is increased in level to a normalized signal voltage $E_b$ in the range of approximately 100 mV by the amplification of the variable gain amplifier 108. After processing by the main channel phase detector 132 and the DC amplifier 140, $E_b$ becomes the DC signal $E_B$. $E_B$ is stored in the $E_B$ track and hold circuit 144 on command of the mode sequencer controller 168. After a predetermined time period (e.g. 0.85 seconds), the timer within the mode sequencer controller 168 changes the switch 112 thereby disconnecting the bottom sensor 34 and connecting the top sensor 30 to the variable gain amplifier 108. The sensor 30 registers the flux from the conductor 46 as the voltage $e_t$. The voltage $e_t$ is changed to a signal voltage $e_t'$ by the affect of the buffer 104. The voltage $e_t'$ is increased to th signal voltage $E_t$ by the action of the variable gain amplifier 108. After processing by the main channel phase detector 132 and the DC amplifier 140, $E_t$ becomes the DC signal $E_T$ which is inputted in the $E_B/E_T$ comparator 146.

Referring to FIG. 5, once the digital depth gain controller 122 is activated, it commands precise digital step increases in gain to the amplifiers 182, 192 and 198 and incremental increases in $\Delta G$ via the AGC-DAC 204 until the voltage $E_T$ is equal to the voltage $E_B$. The required increase in gain to make $E_T$ equal to $E_B$ is designated as $\Delta G$. The data required for determining $\Delta G$ is transmitted to the depth computer 128 and the value of $\Delta G$ is transmitted to the ratiometric circuit 149 where it is converted to the depth figure $D_N$ for display as the digital readout 56. In the ratiometric circuit 149, $D_N$ is calculated from equation 2 below:

$$D_N = \frac{V_3}{\Delta G} - V_2 \qquad (2)$$

where, $V_3$ = constant vertical component of the distance between the top sensor 30 and the bottom sensor 34 (see FIG. 3);

$\Delta G$ = the gain increase required to make $E_T$ equal to $E_B$; and $V_2$ = the constant distance between the bottom sensor 34 and the surface 48 (see FIG. 3).

In order for the depth figure $D_N$ to be accurately determined, the apparatus 10 should be positioned directly over the conductor 46. To properly position the apparatus 10, the left, right and center sensors 38, 42 and 32, respectively, are used to determine the lateral displacement of the apparatus 10 from the conductor 46. In operation, when the mode switch 62 is set to the normal mode, the display panel 54 and the speaker 50 indicate whether the conductor 46 is located to the left or to the right of the apparatus 10. The operator then moves in the direction indicated by the direction indicator 59 until the display panel 54 indicates that the conductor 46 is directly below the apparatus 10. The depth switch 66 is then depressed to take a depth measurement.

Referring to FIG. 4, when the mode switch 62 is set in the normal mode position, the mode sequencer controller 168 activates the sensors 32, 34, 38 and 42. The flux from the signal propating on the conductor 46 is registered as the signal $e_b$ by the sensor 34. The $e_b$ signal (or its derivative signals) is used as a phase reference for the left/right phase detector 160 and also provides a signal power indication.

The $e_b'$ signal is inputted into the variable gain amplifier 108 for amplification to a standard level ($E_b$). The output voltage $E_b$ enters the crystal PLL and clock circuit 136 where the PLL 136 locks onto the signal and the clock source provides voltage waveforms to clock the main channel phase detector 132 and the left/right phase detector 160.

The output from the variable gain amplifier 108 also goes to the main channel phase detector 132 where it is synchronously detected to remove interfering signals, after which the DC resultant is amplified by the DC amplifier 140 to form $E_B$ which is passed through the AGC track and hold circuit 142 (operating in the "track" mode) to the AGC amplifier 150. The output of the AGC amplifier 150 drives the AGC attenuators (the FETs 188, 194 and 200) in the variable gain amplifier 108 to maintain the standard level output.

The output from the AGC amplifier 150 also goes to the ratiometric circuit 149 where commands from the mode sequencer controller 168 cause conversion of the output to segment driving voltages for delivery to the digital readout 56 where it is displayed as the signal power indication which represents the change in output from the AGC amplifier 150 necessary to maintain a constant output at the DC amplifier 140.

Output voltage from the DC amplifier 140 also enters the lock detector 148 whose output activates the lock indicator 60 when the signal from the conductor 46 is adequate for left/right and depth mode operation.

The signal voltage from the sensors 32, 38 and 42 provide left/right information by combining so as to provide zero voltage when the apparatus 10 is directly over the conductor 46. When the apparatus 10 is to the left of the conductor 46, the combined voltage signal ($e_s$) from the sensors 32, 38 and 42 has a phase similar to the signal $e_b$. When the apparatus 10 is to the right of the conductor 46, the signal $e_s$ has an opposite phase.

The signal $e_s$ is amplified by the preamplifier 154 (to form $e_s'$) and is inputting to the controllable amplifier 156 where it is subjected to amplification and attenuation by AGC circuits (to form $E_s$) driven by the output voltage of the AGC amplifier 150 which has been processed by the left/right AGC modifier 164.

The output of the controllable amplifier 156 is further amplified by the left/right amplifier 158 and then enters the left/right phase detector amplifier 160 producing a DC output $E_S$ whose amplitude corresponds to the amplitude of the AC input ($e_s$) but whose polarity depends on the phase of the AC input. The bipolar output $E_S$ of the left/right phase detector amplifier 160 then drives four circuits:

1. the bipolar output drives the components within the ratiometric circuit 149 where its polarity causes either the right or left direction indicator 58 to be activated;

2. the bipolar output drives the magnitude amplifier 162 which always delivers a positive voltage which produces the digit and segment drive which activates an increasing number of bars in the lateral distance indicator 59 indicating the lateral distance of the apparatus 10 from the conductor 46;

3. the bipolar output drives the polarity sensitive chopper 172 which, depending on the input polarity, will send either a steady or a chopped 600 Hz voltage to the speaker driver 174; and 4. the bipolar output is inputted in the left/right AGC modifier 164 for the purpose of compressing large left/right signals so as to fit in the direction indicator 58.

Equation 3 describes the relationship between $e_s$, the configuration of the sensor array and the lateral displacement between the apparatus 10 and the conductor 46. Equation 3 can be used to optimize the geometry and sensitivity of the array to meet various design requirements.

$$e_s \sim \cos\left(\arctan \frac{P+L}{D_N + V + V_2}\right)\cos\left(\arctan \frac{P+L}{D_N + V + V_2} + \phi\right) -$$

$$\cos\left(\arctan \frac{P-L}{D_N + V + V_2}\right)\cos\left(\arctan \frac{P-L}{D_N + V + V_2} - \phi\right) +$$

$$k\cos\left(\arctan \frac{P}{D_N + V_1 + V_2}\right)\sin\left(\arctan \frac{P}{D_N + V_1 + V_2}\right)\left(\frac{D_N + V + V_2}{D_N + V_1 + V_2}\right)$$

Equation 3 where, $e_s$ = the total voltage from the sensors 32, 38 and 42;

$D_N$ = distance from surface 48 to the conductor 46;

V = vertical component of the distance from the bottom sensor 34 to the middle of the left sensor 38 or the right sensor 42;

$V_1$ = vertical component of the distance from the bottom sensor 34 to the center sensor 32;

$V_2$ = distance from surface 48 to the bottom sensor 34;

k = sensitivity of sensor 32/sensitivity of sensor 38 or 42 (ideally, k=2 tan $\phi$ to eliminate the vertical sensitivity of the sensors 38, 42 and 32).

P = the distance from the conductor 46 is from the centerline 90 (i.e. the distance to the positions 96 in FIG. 3).

The plot of $E_S$ versus P shown in FIG. 16 is the graphical representation of equation 3. The deep and shallow curves for $E_S$ have been normalized as to peak values as is accomplished in the apparatus 10 by the action of the AGC circuit, which is based on the value of $E_B$ in the normal operating mode. Comparing FIG. 16 with FIG. 15, it is seen that the left/right sensitivity of the apparatus 10 is nearly constant relative to the depth of the conductor 46, whereas the two-coil coaxial sensor configuration of the prior art is far from constant.

The three-sensor, Y-configuration of the present invention provides at least two additional advantages over the prior art. First, the Y-configuration allows the exact tailoring of "deep" vs. "shallow" left/right sensitivities to match the instruments left/right guidance characteristics to the typical requirements of surveying personnel who must establish the location of various underground or concealed utilities, with specified accuracies.

Second, the versatility and optimum performance brought about by this invention does not need to come at the cost of "vertical sensitivity", as would be the case with a 2-coil arrangement if one attempted to tilt the coils. "Vertical sensitivity" is an undesirable characteristic of many common antennae and antenna systems used on similar locators, which causes the receiver to be affected by signal fields other than those directly below the instrument's position or to the right or left of it. It can cause confusing errors, as the operator's search progresses along a typical cable or pipe.

Referring to FIG. 13, the sequence of electronic events occuring when a depth measurement is taken can be explained in more detail. When the depth button is pressed, a positive voltage is applied to the trigger input 374 setting the seven second time constant of R-C circuit 376 in motion with Q-1 going to high voltage and $\overline{Q}$-1 going to low voltage. The low output at $\overline{Q}$-1 goes to the reset pin "R" of the overrange blanking circuit 378.

The high voltage on Q-1 initiates the following sequence:

1. Releases the display timer 368 via R and triggers the time constant of R-C circuit 369 which initiates a visual indication on the digital display 54 that depth information is imminent.

2. Places the AGC track and hold circuit 142 in the hold mode.

3. Starts the R-C circuit 367 charge-up ramp, which will cause comparator 363 output to go hi at 0.8 seconds.

a. that puts $E_B$ track/hold circuit 144 in hold mode.

b. that instructs ratiometric A-to-D converter 149 to select the inputs from the depth computer versus previous tracing signals.

c. goes through the inverter 371 to become lo, and thus to turn off the control switch 112 that previously connected sensor 34 to the input of the main channel amp 108 and to turn off previous inputs to the display converter.

4. That also starts the R-C circuit 366 charge-up ramp, which will cause comparator 362 output to go hi at 0.85 seconds.

a. that will turn on another control switch section that will connect sensor 30 to input of main channel amp 108.

b. that also turns the range ΔG switches in variable gain amp 108.

5. That also starts the R-C circuit 365 charge-up ramp, which will cause comparator 361 output to go hi at 1.3 seconds.

a. that will release a presetting action which sets the gains of the DAC AMPs 204 and 210 at their minimum levels freeing the entire gain system to bring about equality of $E_T$ with the held value of $E_B$.

b. that also provides the positive going clock pulse needed by the overrange blanking circuit 378 to transfer its D input to its output. Its D input is the Q output of the $\overline{E}_B/E_T$ comparator 146, therefore Q goes high allowing R-C circuit 369 to charge up ending the display blanking period between the normal depth periods.

Six to seven seconds after the depth button 66 is pressed, the master depth timer period is completed, and Q-1 goes lo, restoring all sequencer circuits to their original "ready" mode. The R-C circuits associated with the comparators 361, 362 and 363 are rapidly reset by their respective diodes, which are pulled down by the master timer's Q-1 going lo. The output of comparator 361 goes lo, sending the preset inputs of the counters hi, to ready the counters 356 and 358 for another "depth cycle" when called on.

The range controller circuit 130 has two basic functions. First, it performs a preset function which holds the AC and DC-DAC AMP circuits 204 and 210 at their minimum gain levels (approximately unity) while the apparatus 10 is functioning in the tracing mode and when the apparatus 10 is initially placed in the depth mode.

Second, during the seven second depth cycle process, the range controller 130 acts to set two gain ranges, range one and range two, in which the variable gain amplifier 108 can function. Range one is utilized when the conductor 46 is approximately seventeen to one hundred and fifty-five inches from the surface 48. Range two is utilized when the conductor 46 is approximately zero to twenty-one inches from the surface 48. The approximate four inch overlap between ranges one and two prevents range recrossing problems from occurring when the conductor 46 is located in the overlap region. In range one, $\Delta G$ will be of moderate value and the DC-DAC 212 and the depth computer 128 will need to work with the relatively higher DC voltages. To permit this, the range controller 130 sends a signal to the MOSFETs 224 and 227 which shorts out the resistor 225 and 235. In range two where higher $\Delta G$ values are encountered, the MOSFETs 224 and 227 are deactivated so as to keep the voltage representing $\Delta G$ from exceeding the swing margins of the operational amplifier 222.

When the R-C circuit 365 releases the counters 356 and 358, an in-range range-one value of $E_T$ causes the $E_B/E_T$ comparator 146 to feed a "Lo" signal to the NOR gate 336 which in turn instructs the NOR gate 338 to instruct the four bit counters 356 and 358 to count down. This causes the DAC AMP circuits 204 and 210 to increase their gain. For a depth between seventeen and one hundred and fifty-five inches, the counters 356 and 358 will immediately bring $E_T$ and $E_B$ into equality and will dither around the correct bit value until the seven second cycle is complete.

If the depth is less than seventeen inches, the four bit counter 356 instructs the range controller 130 via the inverter 340 and flip-flops 342 to switch to range two (boost gains of amps 192 and 198).

The switch from range one to range two occurs when the inverter 340 observes that the most significant bit in the digital depth gain controller 122 has changed from one to zero. Alternatively, if the system is in range two and $\Delta G$ exceeds the amount necessary to make $E_T=E_B$, the up/down comparator 146 drives the system back to range one.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An apparatus for determining the distance to a concealed conductive object comprising:
   a first means, located at a first position a distance from a concealed conductive object, for receiving an electromagnetic signal radiated from the concealed conductive object, and for providing a first electrical signal proportional to the strength of said electromagnetic signal at said first position;
   a second means for receiving said electromagnetic signal, positioned at a second position for providing a second electrical signal proportional to the strength of said electromagnetic signal at said second position;
   an amplifier means having a variable gain for amplifying said second electrical signal and providing a third electrical signal;
   comparator means for comparing a fourth electrical signal related to said third electrical signal to a fifth electrical signal, related to said first electrical signal, and for causing the amplifier means to vary said variable gain by a net gain change amount until a predetermined relationship between said fourth and fifth electrical signals is achieved; and
   a computing means for determining said distance based on said net gain change amount.

2. An apparatus for determining the distance to a concealed conductive object comprising:
   a first sensor located at a distance from a concealed conductive object for receiving an electromagnetic signal radiated from said concealed conductive object and for providing a first electrical signal proportional to the strength of said electromagnetic signal at the first sensor;
   a second sensor positioned a selected vertical distance from the first sensor for receiving said electromagnetic signal and for providing a second electrical signal proportional to the strength of said electromagnetic signal at the second sensor;
   a variable amplifier means with an input, an output and a variable gain, the variable amplifier means being connected to receive said first and second electrical signals at said input and for providing a first amplified output signal related to said first electrical signal, and a second amplified output signal related to a said second electrical signal, at said output;
   a detecting means for converting said first amplified output signal to a first direct current (DC) signal and said second amplified output signal to a second direct current (DC) signal;
   a variable gain control means for directing the variable amplifier to change said variable gain during the amplification of said second electrical signal until said second DC signal and said first DC signal achieve a predetermined relationship;
   a gain change quantifying means connected to said variable gain control means for determining a net gain change required to achieve said predetermined relationship; and
   a computing means connected to the gain change quantifying means for calculating the distance to said concealed conductive object based upon said net gain change.

3. The apparatus of claim 2 wherein, the variable amplifier means comprises a plurality of iteratively connected amplifiers with the total gain of said plurality of amplifiers being controllable.

4. The apparatus of claim 3 wherein, at least one of said iteratively connected amplifiers includes a digital-to-analog converter.

5. The apparatus of claim 2 wherein, the gain change quantifying means comprises a direct current digital-to-analog amplifier.

6. The apparatus of claim 2 wherein, the computing means comprises a ratiometric analog-to-digital converter.

7. The apparatus of claim 2 further comprising, range control means for setting at least two different gain ranges in which said variable gain control means can operate.

8. The apparatus of claim 7 wherein,
the range control means comprises at least one NOR gate circuit.

9. The apparatus of claim 2 wherein,
the variable gain control means comprises at least one digital bit up-down counter.

10. The apparatus of claim 2 further comprising,
a third sensor positioned between the first sensor and the second sensor for receiving said electromagnetic signal radiated from said concealed conductive object and for providing a first lateral electrical signal;
a fourth sensor connected to the third sensor and positioned at an angle less than ninety degrees relative to a magnetic axis of the third sensor for receiving said electromagnetic signal radiated from said concealed conductive object and for providing a second lateral electrical signal;
a fifth sensor connected to the fourth sensor and symmetrically positioned about the third sensor with respect to the fourth sensor at the same angle as the fourth sensor for receiving said electromagnetic signal and for providing a third lateral electrical signal, whereby the combined amplitudes of said first, second and third lateral electrical signal produce a total lateral electrical signal having a lateral signal phase;
a lateral signal amplification means for producing an amplified lateral signal having said lateral signal phase, by amplification of an intermediate signal voltage related to said total lateral electrical signal; and
a phase detection means for comparing said lateral signal phase to a reference phase and for producing a direct current (DC) lateral signal which has a DC amplitude related to the amplitude of said amplified lateral signal and a polarity related to said lateral signal phase.

11. The apparatus of claim 10 further comprising,
an indicator means for utilizing said polarity as an indication of the lateral direction to said concealed conductive object.

12. The apparatus of claim 10 further comprising,
an indicator means for utilizing said DC amplitude as an indication of the lateral distance to said concealed conductive object.

13. An apparatus for determining the lateral direction to a concealed conductive object comprising:
a first sensor having a magnetic axis for receiving an electromagnetic signal radiated from a concealed conductive object and for providing a first electrical signal having a first signal phase;
a second sensor having a magnetic axis positioned relative to the magnetic axis of the first sensor, for receiving said electromagnetic signal and for providing a second electrical signal;
a third sensor connected to the second sensor and positioned at an angle less than ninety degrees relative to the magnetic axis of the second sensor for receiving said electromagnetic signal and for providing a third electrical signal;
a fourth sensor connected to the third sensor and symmetrically positioned about the second sensor with respect to the third sensor at the same angle as the third sensor for receiving said electromagnetic signal and for providing a fourth electrical signal, whereby the combined amplitudes of said second, third and fourth electrical signals produce a lateral electrical signal having a lateral signal phase;
a first amplification means for amplifying said first electrical signal and providing a first amplified signal;
a second amplification means for providing a second amplified signal having said lateral signal phase and a lateral signal amplitude by amplification of an intermediate electrical signal related to said lateral signal voltage; and
a phase detection means for comparing said lateral signal phase to said first signal phase and for producing a direct current (DC) lateral signal which has a DC amplitude related to said lateral signal amplitude and a polarity related to said lateral signal phase.

14. The apparatus of claim 13 further comprising,
an indicator means for utilizing said DC amplitude as an indication of the lateral distance to said concealed conductive object.

15. The apparatus of claim 13 further comprising:
an indicator means for utilizing said polarity as an indication of the lateral direction to said concealed conductive object.

16. A method for determining the lateral direction to a concealed conductive object comprising the steps of:
applying an electromagnetic signal to a concealed conductive object laterally displaced from a detector apparatus;
detecting the electromagnetic signal at a sensor array as an array signal having an array signal phase, the sensor array being part of said detector apparatus and comprising at least one reference sensor for providing a reference signal having a reference phase, and at least one sensor oriented along a centerline axis connected to at least two sensors symmetrically positioned about said centerline axis at an angle less than ninety degrees to said centerline axis; and
determining said lateral displacement by comparing said array signal phase to said reference phase.

* * * * *